Patented June 2, 1953

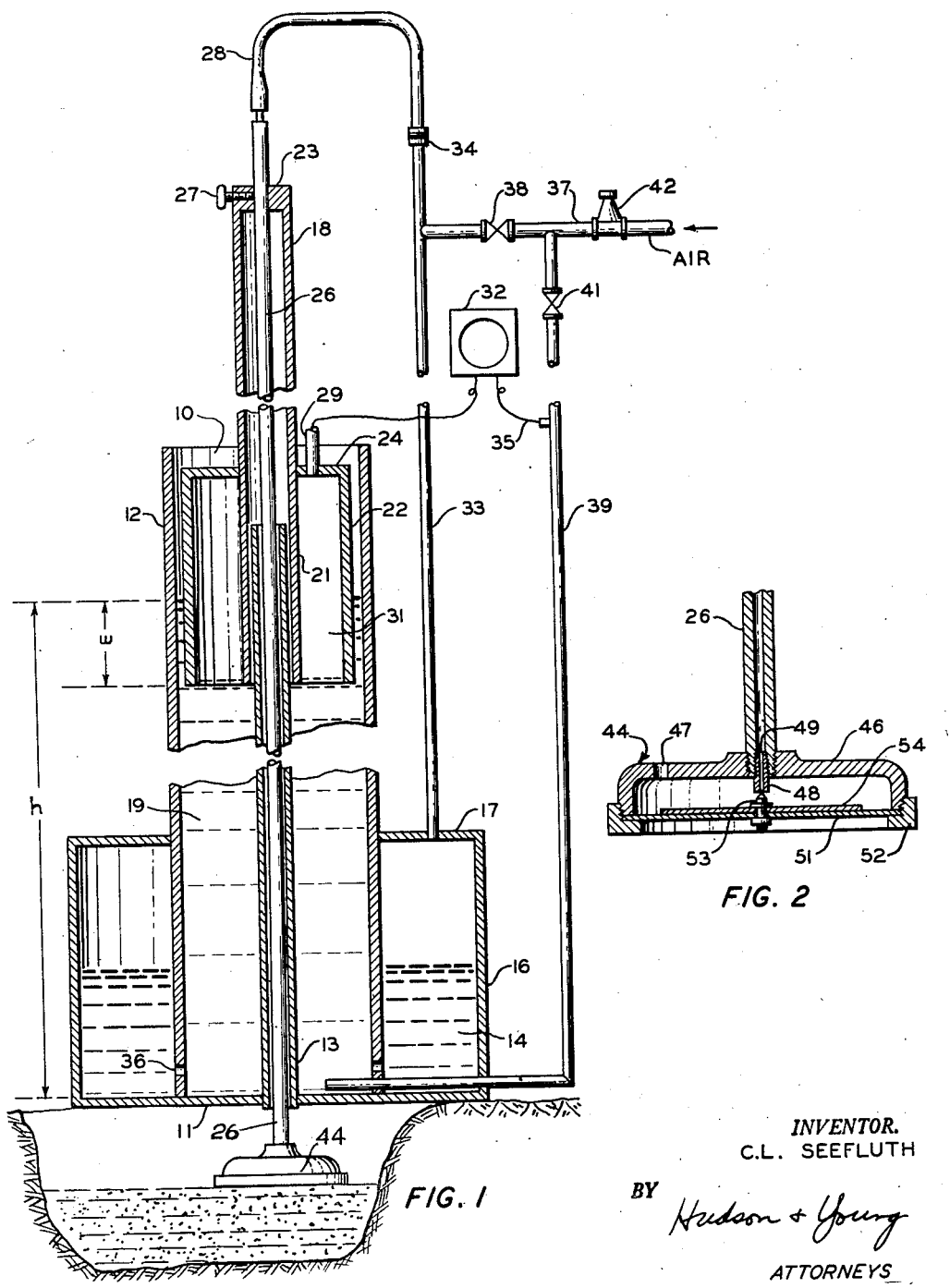

2,640,269

UNITED STATES PATENT OFFICE 2,640,269

LIQUID LEVEL INDICATOR

Charles L. Seefluth, Bartlesville, Okla., assignor to Phillips Petroleum Company, a corporation of Delaware Application December 30, 1949, Serial No. 136,112

3 Claims. (Cl. 33—126)

This invention relates to apparatus for measuring the level of a liquid. In one of its more specific aspects it relates to a device for measuring the level of a liquid such as drilling mud and other thixotropic fluids.

The term "liquid" as used herein is to encompass such materials as water, liquid suspension, colloids, muds, oils, and other flowable materials of similar character with or without solids being present therein, which materials are capable of conforming to the contours of a containing vessel.

One embodiment of this invention is directed to a device for measuring the level of drilling mud in mud pits in which capacity this device has particular utility as will be apparent on referring to the accompanying drawings and disclosure. Many other uses may be made of the device of my invention, most of them being the determination of an interface between a liquid or liquid-like material and a gas.

For convenience, the discussion of my invention will be restricted to its use in determining the level and variation of level of drilling mud in a mud pit, however this is not to be interpreted as a limitation upon the use of the apparatus.

In drilling wells by the rotary method, drilling mud is normally circulated down through the drill pipe and up through the annular space between the drill pipe and bore hole, however a reverse flow is often used also. The mud functions to cool the bit, to remove the cuttings from the bore hole, to prevent caving of the bore hole wall, and to provide sufficient hydrostatic pressure to overcome the pressure of the formations penetrated. A close control of the physical and chemical properties (specific gravity, gel strength, pH, etc.) of the drilling mud throughout a drilling operation is highly desirable, along with a close check of the increase or decrease of the mud level in the mud pit. It is necessary to keep a close check on the properties of the drilling mud in order to condition the mud for the drilling operation at hand. A close check must be kept on the mud pit level in order to prevent a stuck drill pipe and/or blow out. A drop in the level in the mud pit generally means a loss of fluid to the formations which could lead to lost circulation, while an increase in the level generally means the mud is being cut with gas from a formation. This latter condition could lead to a blow out if steps are not taken to convert the conditions causing a change in mud level. A close check on the level in the mud pit with an understanding of what the change in level means, together with the simultaneous determination of the physical and chemical properties of the mud, enables the operator to change or condition the mud so that it will properly function for the drilling conditions being encountered at that instant. There are many instruments that can be used to determine the chemical or physical properties of the mud and these instruments appear to be satisfactory. However, at the present time the mud level in the pit is determined by crude markings on gage sticks or by a float. Since the specific gravity of the mud changes during the course of drilling, the position of the float in respect to the mud level also changes. Consequently the mud level signalled by the float is inaccurate.

An object of this invention is to provide a new type liquid level measuring device.

Another object of this invention is to provide an accurate level indicating device for use in the determination of the interface between gases and liquids.

Another object of this invention is to provide a level sensing device which will indicate the true level of a liquid of varying specific gravity.

Another object of this invention is to provide a device operated by means other than electricity for indicating the level of liquids.

Still another object of this invention is to provide a pneumatically operated device for measuring the level of liquids.

Another object of this invention is to provide an apparatus for measuring the level of mud in a mud pit.

Other objects and advantages of this invention will be apparent to one skilled in the art from the accompanying disclosure and discussion.

Figure 1 is a vertical cross section, partly in elevation, of one preferred embodiment of the apparatus of my invention. Figure 2 is a vertical cross section of the sensing portion of my apparatus.

The apparatus of my invention may be fabricated of many parts and from a considerably varied group of materials. For example, the float chamber may be constructed of steel or other metal, or even of wood, preferably treated against rot and bound together such as by metal hoops and the like. Conventional materials may be used throughout the fabrication of my apparatus and may be readily selected by those skilled in the art.

Refer now to Figure 1. Float chamber 10 is comprised of base 11, side wall 12 extended upwardly from said base, and axially positioned guide tube 13 extended upwardly from said base. Reservoir 14 positioned around the lower portion of float chamber 10 forms a jacket thereabout, wall 12 being common to both. Base 11 of chamber 10 is also the base of reservoir 14. The volume of this reservoir is preferably of such size that when the apparatus is out of use liquid will not flow back through the gas conduits discussed herein below. Concentrically positioned wall 16 and top 17 form the outer periphery of the reservoir. Float 18 is positioned such that it may float freely up and down on the liquids 19 in the float chamber 10 depending upon the liquid level therein. It is comprised of walls 21 and 22 and top members 23 and 24. The lower end of said float is open. Slidable conduit 26 is axially positioned with respect to said float, extending through the top thereof and being rigidly attached thereto as by set screw 27. Conduit 26 extends below the base of float chamber 10 in all positions of float 18. Attached to slidable conduit 26 and communicating therewith is flexible conduit 28, constructed and attached to conduit 26 in such a manner that the rising and lowering of float 18 is not inhibited. Attached to float 18 and preferably to the top member 24 thereof is another flexible conduit 29 by means of which the pressure within zone 31 is transmitted to pressure differential recorder 32.

Flexible conduit 29 is attached to rigid conduit 33 by suitable means such as connection 34. Conduit 33 extends downward outside of float chamber 10 and is attached to reservoir 14 in a manner to communicate with the upper portion of the space therein. Preferably, such communication is provided by a hole in top member 17. It is within the scope of my invention for conduits 29 and 33 to be rubber hose, telescoping metal conduits, or swivelled or jointed conduit of such a character as to allow the free vertical movement of float 18. Communication between reservoir 14 and float chamber 10 is provided by perforations 36 in wall 12. Attached to conduit 33 is conduit 37 which may be any suitable gas line as from an air compressor. Hand operated valve 38 in line 37 may be a needle valve or a globe valve or flow regulating means of a similar type which may be utilized to regulate the flow of gas uniformly to conduit 33. Leading from conduit 37 is conduit or bubbler tube 39 which communicates with float chamber 10 through the outer wall 12. The outlet of bubbler tube 39 should terminate directly below the float. Manually controlled valve 41 is placed in line 39 for adjusting the flow of gas therethrough and may be similar to valve 38 in conduit 37. Sufficient pressure is applied to said gas to cause it to bubble from the outlet of tube 39 into the float chamber no matter how much liquid is in the chamber. Valve 42 in conduit 37 is one for pressure reduction and may be of any suitable construction, preferably such that it will operate automatically. Conduit 35 attached to conduit 39 transmits to recorder 32 the variation in pressure in conduit 39. Conduit 29 transmits to the differential recorder the pressure within float 18 used as the reference pressure with which the changes in pressure due to variation in the liquid level in the float chamber transmitted to the recorder through conduit 35 are compared. The pressure differential recorded by recorder 32 is equal to the distance $h$ which is the depth of liquid in the float chamber less the distance $w$ which is the depth of submersion of float 18. Since the bottom 11 of float chamber 10 is positioned in a known relation to the bottom of the mud pit the pressure differential recorded by 32 is a function of the mud level in the pit.

Attached to the lower end of conduit 26 is sensing device 44 which contains a diaphragm operated needle valve which closes on contacting a liquid.

Refer now to Figure 2 which is a more detailed drawing of the sensing device. Body 46 of this device is preferably of a shape similar to that of an inverted cup and is axially positioned with respect to conduit 26. Opening 47 is provided to allow the escape of gas therefrom and may have an upwardly extending portion (not shown) to prevent admission of mud to the interior of the sensing device. Valve seat 48 is also axially positioned with respect to conduit 26 and is supported thereby. It is provided with a passage 49 running longitudinally therethrough for the passage of gas from conduit 26, which longitudinal passage terminates at the point where the needle of the valve seats. Diaphragm 51 is placed over the open end of of the body of the sensing device and is secured thereto as by follower 52. Needle 53 with a supporting flange 54 is attached to diaphragm 51 in such a manner that when the diaphragm is depressed in the direction of conduit 26 it seats in valve seat 48 and closes off the passage 49. The supporting flange 54 prevents undue bending of the diaphragm 51.

In operating the apparatus of my invention sufficient liquid, such as water, is used to support the float 18 at all heights of operation. Sufficient pressure is maintained on the liquid in reservoir 14 to force the necessary amount of liquid into the float chamber to hold the float at the desired level. In operation when the sensing device is in contact with a liquid whose level is to be measured, the diaphragm valve will be closed, thus restricting the flow of air therefrom and forcing air to be passed through conduit 33 into the reservoir. In this manner additional liquid is forced into float chamber 10 thus raising the float and concomitantly the sensing device. When the sensor is raised sufficiently that the diaphragm valve opens, air escapes therethrough thus relieving the pressure on the reservoir and allowing liquid to flow thereto from the float chamber and lowering the float. In steady-state operation the action of my apparatus will be such that float 18 will oscillate up and down only slightly or will come to rest in a position such that the diaphragm valve is opened only sufficiently to allow a balance of pressure, i. e. the weight of the liquid in the float chamber against the pressure of the air in line 33.

The differential pressure is not a function of the drilling mud density except insofar as a change in density causes a change in the level of the mud. The sensing device is raised and lowered not by the buoyancy of the mud but by the change in level of the liquid in the float chamber, which level is controlled by the passage or non-passage of air through the needle valve in the sensing device. Any error due to a change in mud density is negligible because of the huge difference between the cross-sectional area of diaphragm 51 and valve seat opening 48. In operation when the sensing device is at the level of the mud the force exerted on diaphragm 51 is such to yield only a slight bleeding of air through the needle valve. When the mud level lowers the needle valve opens wide allowing the gas pressure in the reservoir to become less which in turn forces liquid from the float chamber into the reservoir and thus lowers the float and concomitantly the sensing device until the latter again contacts the surface of the mud. When the mud level increases the bleeding of air stops and the resulting increase in the gas pressure in the reservoir forces liquid into the float chamber thus raising the float so that the sensing device is drawn up to be just barely in contact with the mud surface. Thus the device operates by analogy to the sense of touch.

Actually, by substituting a diaphragm type sensing device for the ordinary float any error in level indication due to changes in specific gravity of the mud is in effect eliminated. And by using a clean liquid in a float chamber with a connecting reservoir and measuring a differential pressure between the hydrostatic head of the float chamber and the gas pressure in the float, any error due to an accumulation on the sensing device is eliminated. That is to say, the quantity $h$ minus $w$ will remain constant so long as the mud level remains constant, since any increase in $w$ will mean the same increase in $h$.

Advantages of my invention are many and varied, one in particular being that of measuring the level of liquids not ordinarily measurable by gauge glasses, sounding rods and like devices. Another advantage, particularly in the field when used in connection with well drilling, is that no electricity is necessary and power failures will not affect the operation of the device. Moreover, my measuring device will function with extreme accuracy when measuring the level of a liquid of varying density, such as drilling mud. Furthermore, any accumulation of mud on the sensor will not affect the accuracy of the readings obtained.

Although the apparatus of my invention has been described and exemplified in terms of its preferred modifications, it is understood that various changes may be made without departing from the spirit and scope of the disclosure and of the claims.

I claim:

1. A liquid level indicator comprising a closed liquid reservoir chamber; a float chamber open at the top and closed at the bottom; means connecting the bottom of said reservoir and the bottom of said float chamber; a float in the general form of an inverted cup disposed in said float chamber, there being liquid in said reservoir and said float chamber upon which said float rides; a slidable pipe rigidly attached to said float; a sensor device mounted on the bottom of said slidable pipe, said sensor including an escape valve closable on pressure contact with the liquid being gauged; means for guiding movement of said slidable pipe, sensor and float in a vertical direction; means for supplying an identical fluid pressure to the upper end of said slidable pipe and thus to said sensor and to the reservoir chamber whereby the level of the liquid in said float chamber and the position of said float will be established upon contact of said sensor with the liquid to be gauged; and pressure responsive means communicating with the bottom of said float chamber and with the inside of said float and adapted to measure the pressure differential existing between said two points, said means being calibrated in terms of the vertical position, viz, liquid level, at said sensor.

2. A liquid level indicator comprising a closed liquid reservoir chamber adapted to be arranged above the liquid to be gauged; a float chamber disposed within said reservoir chamber and being sealed to the upper and lower walls of said reservoir, said float chamber being provided with an opening in its wall adjacent the lower wall of said reservoir, the lower wall of said reservoir being provided with an opening within said float chamber; a guide tube sealed to said last-mentioned opening and extending upwardly within said float chamber; a pipe slidable within said guide tube; a sensor device mounted on the lower end of said pipe, said sensor including an escape valve closable on pressure contact with the liquid to be gauged; a float in the general form of an inverted cup disposed in said float chamber, the top of said float being attached and sealed to said slidable pipe, there being liquid in said reservoir and float chamber upon which said float rides; means for supplying an identical fluid pressure to the upper end of said slidable pipe and thus to said sensor and to the reservoir whereby the level of the liquid in said float chamber and the position of said float will be established upon contact of said sensor with the liquid to be gauged; and pressure responsive means communicating with the bottom of said float chamber and with the inside of said float and adapted to measure the pressure differential existing between said two points, said means being calibrated in terms of the vertical position, viz, liquid level, at said sensor.

3. A liquid level indicator comprising a closed liquid reservoir chamber adapted to be arranged above the liquid to be gauged; a float chamber within said reservoir and being sealed to the upper and lower walls of said reservoir, said float chamber being provided with an opening in its wall adjacent the lower wall of said reservoir, the lower wall of said reservoir being provided with an opening within said float chamber; a guide tube sealed to said last-mentioned opening and extending upwardly within said float chamber; a pipe slidable within said guide tube; a sensor device mounted on the bottom of said slidable pipe comprising a body portion in the general form of an inverted cup, said body being provided with a hole for the escape of gas, an escape valve positioned within said body and a diaphragm positioned over the open end of said body and adapted to close said escape valve on pressure contact of said sensor with the liquid being engaged; a float in the general form of an inverted cup disposed in said float chamber, the top of said float being attached and sealed to said slidable pipe, there being liquid in said reservoir and float chamber upon which said float rides; a source of air under pressure; means for supplying an identical air pressure to the upper end of said slidable pipe and thus to said sensor and to the reservoir whereby the level of the liquid in said float chamber in the position of said float will be established upon contact of said sensor with the liquid to be gauged; conduit means communicating with said source of air and the bottom of the float chamber whereby air will bubble from the bottom of said float chamber into the float; and pressure responsive means communicating with said last-mentioned circuit means and with the inside of said float and adapted to measure the pressure differential existing between said two points, said means being calibrated in terms of the vertical position, viz, liquid level, at said sensor.

CHARLES L. SEEFLUTH.

References Cited in the file of this patent

UNITED STATES PATENTS

| Number | Name | Date |
| --- | --- | --- |
| 377,369 | Boggs | Feb. 7, 1888 |
| 1,241,384 | Hueber | Sept. 25, 1917 |
| 1,596,774 | Star | Aug. 17, 1926 |
| 2,537,246 | Thoresen | Jan. 9, 1951 |